United States Patent [19]
Legras et al.

[11] 4,355,215
[45] Oct. 19, 1982

[54] REMOTE CONTROL SYSTEMS FOR TELECOMMUNICATIONS LINKS

[76] Inventors: Jacques Legras, 18, rue E. Le Taillandier; Patrice Pyronnet, Bat. 332 Zup Keruhel, both of 22300 Lannion, France

[21] Appl. No.: 194,788

[22] Filed: Oct. 7, 1980

[30] Foreign Application Priority Data

Oct. 8, 1979 [FR] France ............................ 79 24979

[51] Int. Cl.$^3$ ............................................. H04B 3/46
[52] U.S. Cl. ........................ 179/175.31 R; 178/69 G
[58] Field of Search .................. 179/175.31 R, 170 F; 178/69 G, 70 R, 71 R, 73

[56] References Cited

U.S. PATENT DOCUMENTS

| | | | |
|---|---|---|---|
| 3,764,760 | 10/1973 | Marchini | 179/175.31 R |
| 3,864,528 | 2/1975 | Heynen | 179/175.31 R |
| 3,976,835 | 8/1976 | Larner et al. | 179/175.31 R |
| 4,161,634 | 7/1979 | Bellisio | 179/175.31 R |
| 4,161,635 | 7/1979 | Wolaver | 179/175.31 R |

FOREIGN PATENT DOCUMENTS

| | | |
|---|---|---|
| 2330226 | 5/1977 | France . |
| 2395650 | 1/1979 | France . |
| 1420078 | 1/1976 | United Kingdom . |

OTHER PUBLICATIONS

Busse: "Das Trägerfrequenzsystem MVZ-24 . . . auf . . . Luftkabelanlagen", *Frequenz* vol. 33, No. 2, 2/79, pp. 43–51.

Camborde et al: "Equipements de ligne pour Systeme . . . à paires Coaxiales", *Cables et Transmissions* vol. 32, No. 2, Apr. 1978, pp. 278–337.

*Primary Examiner*—Thomas A. Robinson

[57] ABSTRACT

A remote control system for a telecommunications link between two stations, one being a monitoring station and the other a monitored station, interconnected by an outward channel and a return channel, said channels having a plurality of signal regenerating member pairs. The monitoring station comprises means for transmitting by a low frequency channel and in the outward direction a sequence of P pulses, a control circuit being placed in each pair of regenerating members and comprising means for detecting the pulses received, for counting the number n of said pulses, for comparing this number with two predetermined numbers $n_1$ and $n_3$ with $n_3 \neq 0$ and $n_3 < n_1$ and when $n \geq n_1$, transmitting to a first output $n - n_2$ the pulses received and when $n_3 < n < n_1$ transmitting to a second output the control order and transmitting no pulse to the first output, the number P of pulses transmitted by the monitoring station being selected equal to $Nn_2 + n_i$ in which $n_i$ is a number between $n_3$ and $n_1$ when a remote control order has to be transmitted to the member occupying rank N on the outward channel.

8 Claims, 10 Drawing Figures

REMOTE CONTROL SYSTEMS FOR TELECOMMUNICATIONS LINKS

BACKGROUND OF THE INVENTION

The present invention relates to a remote control system for telecommunications links. The remote control of a link or connection is understood to mean any operation of controlling at a distance the operation of said link involving transmissions of orders and/or information with the object, for example, of locating defective amplifiers or repeaters or monitoring such members, or for locating a transmission cable break, etc. The invention can be used in telecommunications in the case of remotely supplied links.

In telecommunications systems using a physical support (cables with symmetrical or coaxial pairs) the amplifiers of analog links or the regenerative repeaters of digital links are remotely supplied. The transmission of analog or digital signals only occupies the frequency spectrum as from a lower cut-off frequency, leaving free a channel passing from a continuous state to the said cut-off frequency. Thus, in addition to the remote supply current, this channel can transmit a low frequency system. In digital transmission systems, this channel is used for the remote location of defective repeaters or the remote continuous monitoring of the operation of such repeaters.

BRIEF SUMMARY OF THE INVENTION

The present invention relates to a device which can be used in both cases (analog or digital transmission) and which is less complex than the prior art devices. The device according to the invention also makes it possible to locate cable breaks or interruptions, which constitute a large percentage of the operating faults and which are not taken into consideration by the existing systems.

Reference will be made hereinafter and in exemplified manner to links for transmitting digital signals, but the invention is naturally not limited to this type of transmission. Such a link or connection occurs between a monitoring station and a monitored station. The outward transmission channels from the monitoring state towards the monitored station and the return transmission channel from the monitored station to the monitoring station are formed by a pair of e.g. coaxial cables constituted by pairs of sections in each case connected to a pair of regenerative repeaters.

In normal operation, the monitored and monitoring stations remotely supply the regenerative repeaters of the outward and return channels and monitor the normal digital transmission quality of the outward and return channels by analysing the characteristics of the link. These characteristics are mainly the immunity to noise determined by an error level which is below a given threshold and the continuity of information transmission. As soon as one of the monitoring and monitored stations detects a fault, i.e. an abnormal characteristic, the latter produces an alarm signal indicating to the monitoring station operator that it is necessary to remotely locate the fault on the link.

Generally, fault detection involves the successive remote location of pairs of regenerative repeaters from the monitoring station. The latter has equipment controlled by the operator which emits suitable remote location signals. For example, a pair of regenerative repeaters is located, according to known locating procedures, by the remote control of the looping between the output of the regenerative repeater associated with the outward channel and the input of the regenerative repeater associated with the return channel. A digital test signal is thus transmitted by the monitoring station across a given number of regenerative repeaters associated with the outward channel, which is looped onto the return channel by the aforementioned pair of regenerative repeaters and is then transmitted by the same given number of regenerative repeaters associated with the return channel to the monitoring station. Analysis of certain characteristics of the digital signal received makes it possible to determine whether all the pairs of regenerative repeaters preceding the looped pairs are operating correctly. This analysis indicates the defective regenerative repeater and facilitates the putting back into service and maintenance of other pairs of defective regenerative repeaters by measuring the error levels and frequency margins.

Figure 1:
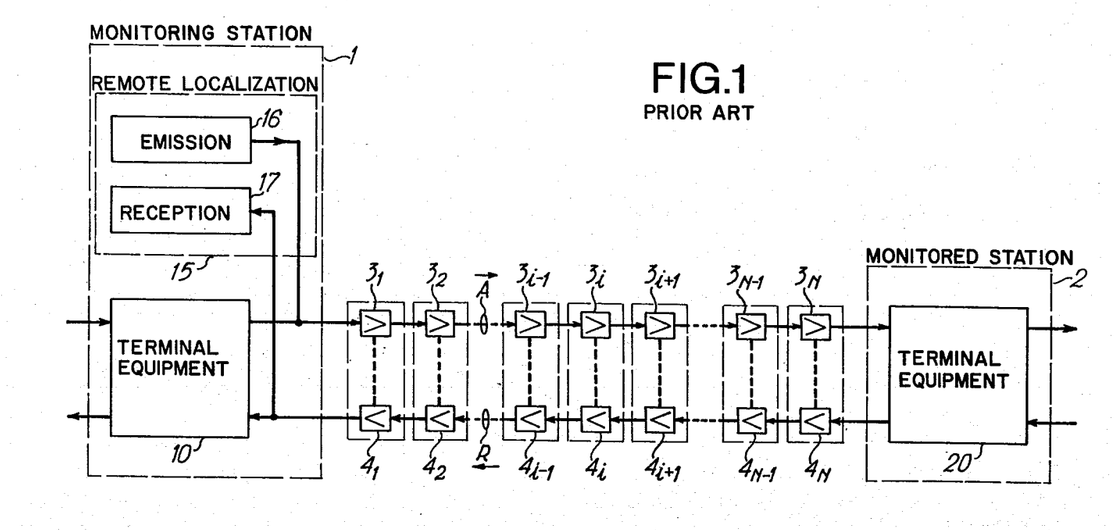

In order to provide a better understanding of the procedure according to the invention for the remote location of regenerative repeaters, a description is given in conjunction with FIG. 1 of the construction and operation of a digital transmission link between a monitoring station 1 and a monitored station 2.

Each station is located at the end of the link in question and has for its transmission support a pair of cables A and R respectively used for the outward direction from the monitoring station 1 to the monitored station 2 and for the return direction from the monitored station 2 to the monitoring station 1. Each station 1, 2 has terminal equipment, respectively 10 and 20 which receives on each channel A, R and transmits on each channel R, A digital signals coming, for example, from not shown multiplexers-demultiplexers. Each terminal equipment comprises in per se known manner a digital signal shaping circuit, optionally associated with a code converter which converts the digital signals in binary code into digital signals in a suitable line code and vice versa, a terminal regenerative repeater allocated to each outward channel A and each return channel R and a remote supply device supplying the direct current necessary for the energising of the regenerative repeater circuits inserted in the outward channel A and the return channel R.

The link is constituted by e.g. coaxial cable pair sections each connected to two regenerative repeaters $3_i$, $4_i$ respectively on the outward and return channels. The regenerative repeaters $3_i$, $4_i$ are separate and are associated in pairs between two sections of the link. FIG. 1 shows n pairs of regenerative repeaters $3_1$-$4_1$ to $3_N$-$4_N$ numbered in accordance with the transmission direction of the digital signals in the outward channel.

The essential function of each regenerative repeater is to amplify and equalize the digital signal received in an attenuated state by its transmission in the preceding section, to restore the shape and phase of the signal pulses received and transmit the regenerated signal on the following section.

With regard to the detection of defective repeaters, the cable digital systems at present in use or development belong to two distinct categories, depending on whether or not this detection takes place during the normal transmission of data.

Figure 2:
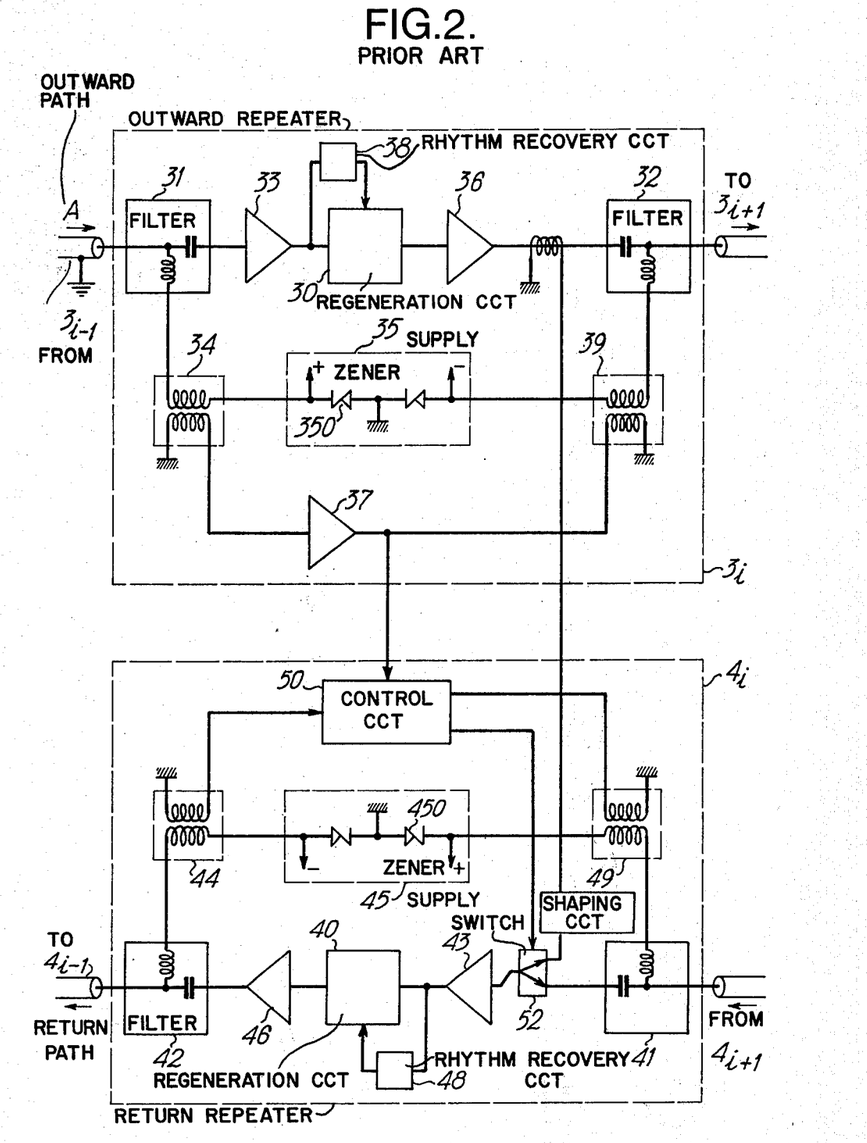

The case of the 140 Mbit/s system on a coaxial cable developed in France and described in the Journal "Cable et Transmission" Volume 32, No. 2 of April 1978 is representative of the majority of existing systems. The block diagram of FIG. 2 shows the various elements of a bidirectional regenerative repeater in the case of said system and illustrates the way in which the remote supply channel is used for the remote location of defective repeaters.

The outward and return regeneration functions are fulfilled by repetition and regeneration circuits 30, 40 respectively located in the regenerative repeaters $3_i$ and $4_i$ allocated to the outward and return channels A, R respectively. An input branching or separating filter 31, 41 and an output branching or separating filter 32, 42 make it possible to separate the digital signal from the direct current transmitted by the remote supply device. The digital signal extracted from the input signal 31, 41 is transmitted to circuit 30, 40 across an equalizer 33,43 then, after restoring the shape and phase, to the output filter 32, 42 across an output amplifier 36, 46. Circuits 30, 40 are associated with rhythm recovery circuits 38, 48.

The direct supply current from input filter 31, 41 is transmitted to a supply circuit 35, 45 connected to the various elements of the regenerative repeater. This supply circuit 35, 45 more particularly comprises Zener diodes 350, 450.

The remote location means are constructed in the following manner. Firstly, the monitoring station 1 contains a remote location circuit 15 able to transmit a low frequency signal $BF_1$ on the outward channel and a low frequency $BF_2$ of the return channel. Then, each regenerative repeater contains a band pass filter 34, essentially constituted by a transformer tuned to the low frequency $BF_1$, an amplifier 37 whose output is connected to a second tuned transformer 39 and a circuit 50 controlling the looping and unlooping of regenerative repeaters $3_i$ and $4_i$ controlled by the amplified low frequency signal. This circuit 50 also receives a signal at said low frequency $BF_2$ extracted from a tuned filter 44. The control signal is able to transmit signal $BF_2$ to the output of the repeater via a tuned transformer 49.

The looping-unlooping of the repeater is obtained by a switch 52 which connects the regeneration chain 43-40-46, either to the output of the repeater $3_i$ via a shaping circuit (looping) or to the input of the repeater $4_i$ (unlooping).

This system operates in the following manner. The low frequency signal $BF_1$ transmitted by the monitoring end of the link is transmitted by all the outward repeaters of the link. Each outward repeater also transmits this signal, following amplification, to the return repeater located at the same regeneration point, which starts the looping of the two repeaters as a result of the link injecting a fraction of the output signal of the outward repeater and at the input of the return repeater.

Thus, from the monitoring end, it is possible to check the operation of the first bidirectional repeater. In the "looping" position, the return repeater interrupts the transmission of the low frequency signal $BF_2$ transmitted from the monitoring end. The interruption of this signal unloops it and reestablishes the continuity of the transmission channel of $BF_2$. Thus, it is possible by successive interruptions of $BF_2$ to carry out the stepwise unlooping of all the repeaters until the fault is located.

A detailed description of this sytem is provided in French Patent Application 2,395,650 filed on June 20, 1977 and entitled "System of remote location on an analog or digital transmission line, which in particular incorporates regenerative repeaters".

With regard to the second category of systems for detecting defective repeaters, reference can be made to the second generation 2 Mbit/s system for a cable with symmetrical pairs described in the Journal "Cable et Transmission" referred to hereinbefore. It has remote monitoring means making it possible to check the transmission quality of each repeater under normal operating conditions. The device used comprises an error detection circuit and a circuit for transmitting this quality data to the terminal. This transmission is supported by a channel permitting the transmission of a low frequency signal from one end of the link to the other. The remote end modulates the carrier frequency by a binary signal representing a frame locking word detected by each repeater which places in the said frame the quality data relating to it before transmitting everything to the following repeater.

Thus, the repeater circuits must recognise the frame locking word, have a clock for processing the data and must even be able to produce a special frame locking word in the case of the failure of the remote monitoring circuit of the preceding repeater. Thus, they are very complex and this leads to the obvious disadvantageous effects with regard to the cost and reliability of the repeater.

However, although systems equipped with remote monitoring are relatively little used, it is probable that advances in technology and requirements of increased availability of such links will make it necessary to adopt such devices on future systems. In the more distant future, it is also possible to envisage systems making it possible not only to detect errors committed during each regeneration, but also able to indicate to the monitoring end on request the operating margin available on the repeater.

The principle of such a device is described in French Pat. No. 2,412,990 entitled "Evaluation of the quality of a digital link of a regenerative repeater or a receiver in such a link".

The device according to the invention can be used in systems belonging to either of the aforementioned two categories. If it equips all the repeaters of a link having a directional transmission channel for a low frequency signal, it is possible to perform the following operations:

The transmission of an order to a given repeater which, in the case of remote location, is able to start looping and then unlooping of a pair of repeaters and in the case of remote monitoring the transmission to one end of the content of an error counter and its resetting, the measurement of the operating margin on the repeater and obviously the transmission of the corresponding value to the terminal or end or both successively.

The checking on the basis of the monitoring end of the operation of the remote monitoring circuits for the repeaters located between said end and the repeater for which the order is intended and an approximate indication of the overall operation of these repeaters.

The location of the regeneration section affected by a cable break or cable fault interrupting the remote supply and transmission of the low frequency signal. The complete device is not necessary in all cases for fulfilling the latter function. The section in question can in fact be determined by using a small volume stand-by supply means (e.g. a cadmium-nickel battery) which is able to supply the circuits necessary for the transmission and processing of the low frequency signal for a few minutes after an interruption of the remote supply. The same principle can be applied to the two Mbit/s 2 G remote monitoring system described hereinbefore or any other system with a similar philosophy.

According to the invention, all these objects are achieved by the use of means substantially as described hereinafter. In the outward direction of the low frequency channel, the line terminal transmits a sequence of P pulses by a random carrier frequency modulation process. For example, a pulse can correspond to about a dozen periods of the carrier signal followed by the absence of a signal for an equal time. It is even possible to directly transmit the P pulses by P clock pulses of said carrier frequency. Following reception and possible demodulation, the circuit placed in the first receiver compares the number n of pulses received with two numbers $n_1$ and $n_3$ with $n_3 \neq 0$ and $n_3 < n_1$:

- if $n \geq n_1$ it transmits $n - n_2$ identical pulses to the following receiver with $n_2 > 1$ and returns $n_4$ pulses to the line terminal by the return direction of the low frequency transmission channels;
- if $n_3 < n < n_1$ the circuit initiates the action ordered by the line terminal (looping, reading and resetting of the error counter), transmits nothing to the following repeater and returns $n_5$ pulses to the end.

To transmit an order to the repeater of rank N, it is consequently sufficient to transmit a train of $n = Nn_2 + n_i$ pulses with $n_3 < n_i < n_1$, $n_3$ being the number of pulses necessary for arming the device and consequently preventing undesired starting operations as a result of an isolated stray pulse.

It is possible to control the satisfactory operation of control circuits by checking the return signal which must have $(N-1) n_4 + n_5$ pulses in N blocks. A repeater located between the addressed repeater and the line terminal can also give the latter an approximate indication of its operation by suppressing one or more pulses of the $n_4$ which it must normally return. The position of the suppressed pulses may or may not be significant. If this circuit and the low frequency transmission members are supplied by a stand-by battery in the case of the remote supply due to a cable fault, the observation of the return signal makes it possible to locate the fault.

BRIEF DESCRIPTION OF THE DRAWINGS

The invention is described in greater detail hereinafter relative to non-limitative embodiments and with reference to the attached drawings, with the exception of FIGS. 1 and 2 which have already been described.

DETAILED DESCRIPTION OF THE PREFERRED EMBODIMENTS

Figure 3:
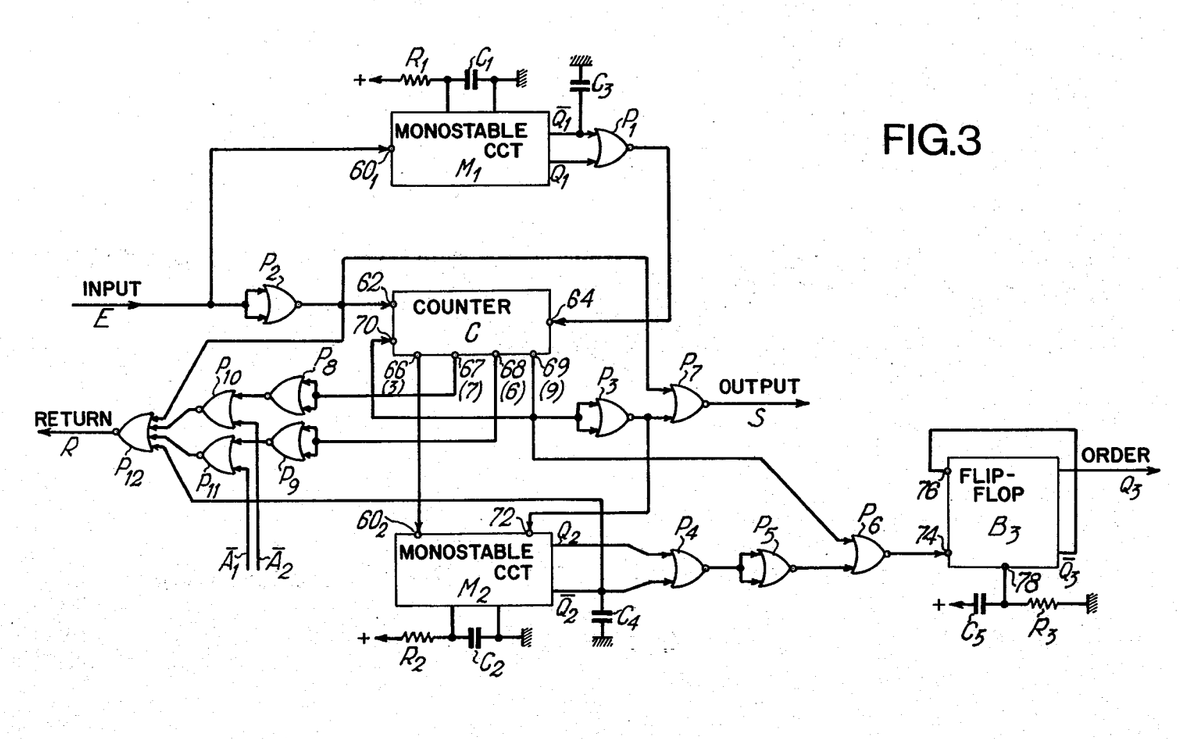
FIG. 3 illustrates a first embodiment of a circuit according to the invention used in a regenerative repeater in the case where the system has a return channel.

The variant illustrated in FIG. 3 corresponds to the case of remotely monitored repeaters. In normal operation, it permits an approximate monitoring of the state of each repeater, this state being represented by a few bits on the return channel. In the case of an incident, interrogation of the suspected repeater makes it possible to obtain supplementary and more detailed information, for example by initiating the reading of the content of an error counter or by measuring an operating margin.

The circuit shown in FIG. 3 comprises an input E, a first output S, a second return output R and a control output $Q_3$. The circuit essentially comprises a first monostable circuit $M_1$, a counter C, a second monostable circuit $M_2$, a flip-flop $B_3$ and logic NOR gates $P_1$ to $P_{12}$. In isolation, all these circuits are known per se, so that in order to simplify the description, a certain number of components will be omitted, such as the supply systems and their connections.

Monostable circuit $M_1$ has an input $60_1$ connected to input E and two complementary outputs $Q_1$ and $\overline{Q_1}$ connected to a gate $P_1$. A capacitor $C_1$ and a resistor $R_1$ define the duration $T_1$ of the output pulses of the monostable circuit. A capacitor 63 is connected between $\overline{Q_1}$ and earth.

Counter C has a clock input 62, a zero resetting device 63, outputs 66, 67, 68 and 69, each corresponding to predetermined numbers and an inhibiting input 70. A gate $P_2$ is located between input E and clock input 62.

Monostable circuit $M_2$ is identical to circuit $M_1$ with an input $60_2$, two complementary outputs $Q_2$ and $\overline{Q_2}$, but a resetting input 72 is used. Input $60_2$ to connected to output 66 of counter C, whilst input 72 is connected to output 69 of the same counter via gate $P_3$. Elements $R_2$ and $C_2$ determine the duration of the output pulses of the monostable circuit and a capacitor $C_4$ is connected to output $\overline{Q_2}$.

A gate $P_4$ with two inputs is connected to $Q_2$ and $\overline{Q_2}$ and its output is connected to the two inputs of a gate $P_5$. The two inputs of a gate $P_6$ are connected in one case to output 69 of the counter and in the other case to the output of $P_5$.

Flip-flop $B_3$ constitutes a divider by two and has a clock input 74, an input 76 and two outputs $Q_3$ and $\overline{Q_3}$ (the latter being relooped on input 76) and a resetting input 78 connected to resistor $R_3$ and to a capacitor $C_5$. The two inputs of a gate $P_7$ are connected to the outputs of $P_2$ and $P_3$. Two gates $P_8$ and $P_9$ have their two inputs respectively connected to outputs 67 and 68 of counter C.

The two inputs of a gate $P_{10}$ and connected on the one hand to the output of $P_8$ and on the other to a connection in logic state $\overline{A_2}$. The two inputs of a gate $P_{11}$ are connected on the one hand to the output of $P_9$ and on the other to a connection in logic state $\overline{A_1}$. The states $\overline{A_1}$ and $\overline{A_2}$ are significant of the state assumed by the quality control devices of the repeater.

Finally, a gate $P_{12}$ has four inputs respectively connected to the outputs of $P_2$, $P_{10}$, $P_{11}$ and to $Q_2$ and one input connected to the return output R.

Figure 4:
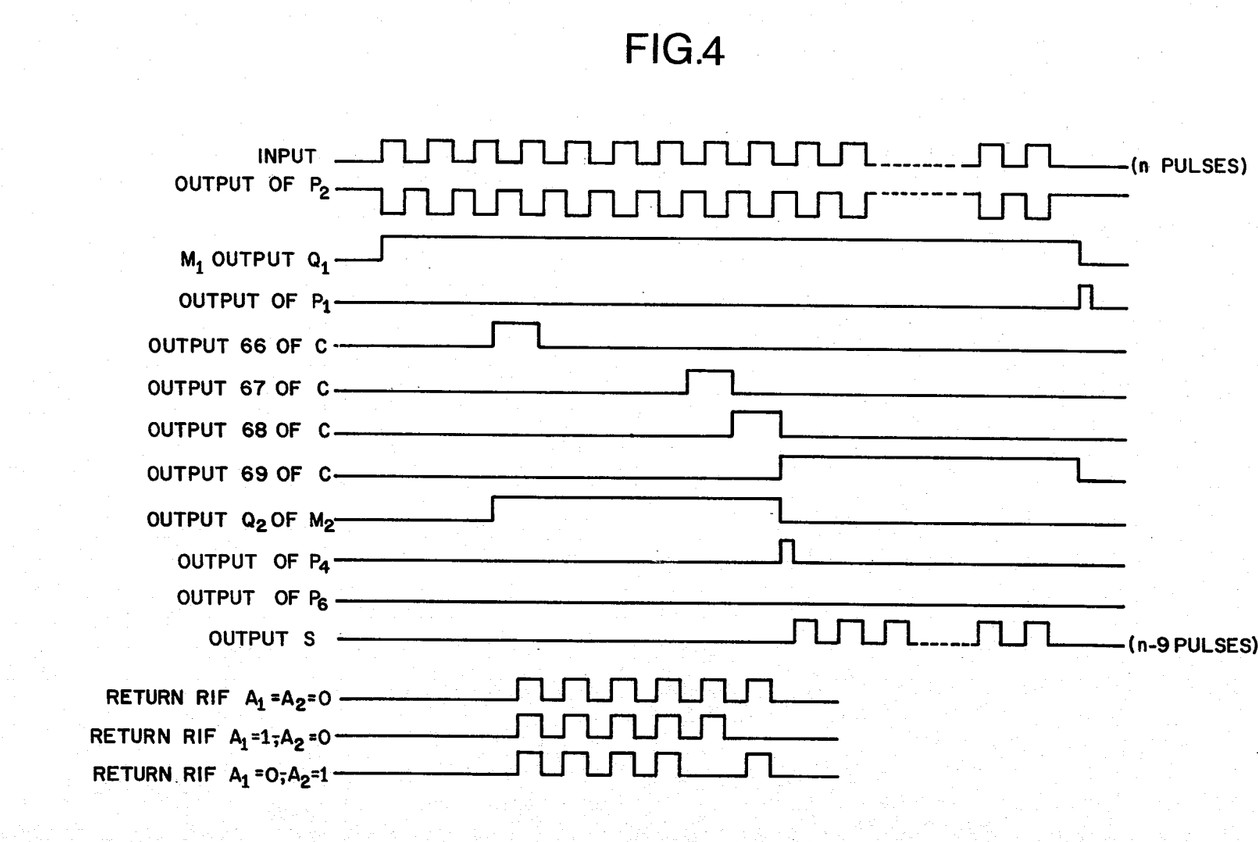
FIG. 4 is a chronogram illustrating the operation of the circuit of FIG. 3 in the case of $(n \geq n_1)$ operations.

To illustrate the operation of this device, the case is assumed where $n_1 = 9$, $n_2 = 9$, $n_3 = 3$, $n_4 = 6$, $n_5 = 3$, $n_i = 6$. Thus, the outputs 66, 67, 68 and 69 of counter C correspond to numbers 3, 7, 8 and 9. The chronogram of FIG. 4 shows the main signals which appear at the various points of the circuit. Operation is as follows.

Firstly, with respect to the monitoring station the pulses are emitted by a generator 16 (cf FIG. 1) and detected by a circuit 17. They will not be described in detail here because they are well known to the Expert.

With regard to the circuit of FIG. 3, it reaches at its input E pulses from the monitoring station transmitted by the low frequency channel superimposed on the transmission channel. The function of $P_2$ is simply to reverse the pulses received at E. The monostable circuit $M_1$ receives the reversed pulses at its input 62. Capacitor $C_1$ and resistor $R_1$ determine the duration $T_1$ of the output pulses of said circuit. This time is not critical and must slightly exceed the period of the pulses received. The output $Q_1$ of $M_1$ consequently remains in the high state whilst the pulse train is at its input and passes to the low state $T_1$ seconds after the leading front of the last input pulse. Capacitor $C_3$ delays the transitions of the signal from $Q_1$. Each trailing edge of the output signal of $Q_1$ produces a pulse at the output of $P_1$ which is applied to the resetting input of counter C.

The output 66 of counter C delivers a signal in the high state between the third and fourth leading fronts of the signal present at its clock input following resetting.

The duration of the output pulses from monostable circuit $M_2$ is determined by capacitor $C_2$ and resistor $R_2$. It must slightly exceed 6 times the period of the pulses received. The passage from low level to high level of the signal appearing at the output 69 of counter C is brought about by the ninth leading edge of the signal present at the clock input 62. It prevents any further advance of counter C when no resetting is carried out via $M_1$ and $P_1$, i.e. at the end of the pulse train received. Finally, the high level present at 69 resets output $Q_2$ of $M_2$ via $P_3$.

The function of the system $M_2$, $C_4$, $P_4$ is identical to that of $M_1$, $C_3$, $P_1$. A pulse is brought about at the output of $P_4$ by the trailing edge of the output signal of $Q_2$. This pulse is then reversed by gate $P_5$, which is identical to $P_1$. If the output 69 of the counter is in the high state (case shown on the chronogram of FIG. 4) the output of $P_6$ remains at zero and does not transmit the pulse present at its other input. If output 69 of C is in the low state, i.e. if the number of pulses received is between 3 and 9 (case shown on the chronogram of FIG. 6 which will be examined hereinafter) the output signal of monostable circuit $M_2$ passes to the low state at the end of the normal period imposed by $R_2$ and $C_2$ and at this time produces a pulse at the output of $P_4$ and consequently at the output of $P_6$, whose other input is at low level. The output pulse of $P_6$ makes a high level appear at the output $Q_3$ of $B_1$ representing the order given to the repeater. Resistor $R_3$ and capacitor $C_5$ connected to the resetting input of flip-flop $B_3$ have the function of resetting output $Q_3$ at the time of energisation.

The order given starts looping in the case of remote location, the measurement of the margin or the reading and resetting of the content of an error counter in the case of remote monitoring. In the first case, a second pulse at the output of $P_6$ brings about the resetting of $B_3$ and consequently unlooping. In the second case, a resetting pulse at input 78 of the flip-flop can be brought about by the actual repeater, after the performance of the operation ordered by the terminal.

Moreover, the output S of $P_7$ is connected to the device for transmitting the low frequency signal to the following repeater. If a number of pulses received is below 9, it transmits nothing. If it exceeds 9, it transmits the pulses present at the input after the ninth pulse.

If the operation of the repeater in question is normal at the time of receiving the pulse train from the terminal, the logic states $A_1$ and $A_2$ are at low level. The outputs at $P_{10}$ and $P_{11}$ are consequently at low level and at the output of $P_{12}$ and for the time of a low level of $Q_2$ and $M_2$ (i.e. between the leading edges of the third and ninth input pulse of counter C) there are six pulses identical to those received. If there has been an operating incident in the repeater and this has been stored by $A_1$ or $A_2$, we obtain $A_1=1$ or $A_2=1$ or $A_1=A_2=1$. If $A_1=1$ (or $A_2=1$) a high level will be present at the output of $P_{11}$ (or $P_{10}$) following the leading edge of the 8th pulse (or the 7th pulse) received at 62 and up to the leading edge of the 9th pulse (or 8th pulse). Thus, the output of $P_{12}$ will remain at zero and will not transmit the 8th pulse (or 7th pulse). If the output of $P_{12}$ is connected to the device for transmitting the low frequency signal returning to the monitoring station, the presence of 6, 5 or 4 pulses will be significant on the one hand of the satisfactory routing of the low frequency signal and on the other of an unsatisfactory operation as from a given repeater, relative to which more detailed information can be obtained, if necessary, by transmitting to it the remote monitoring order.

Figure 5:
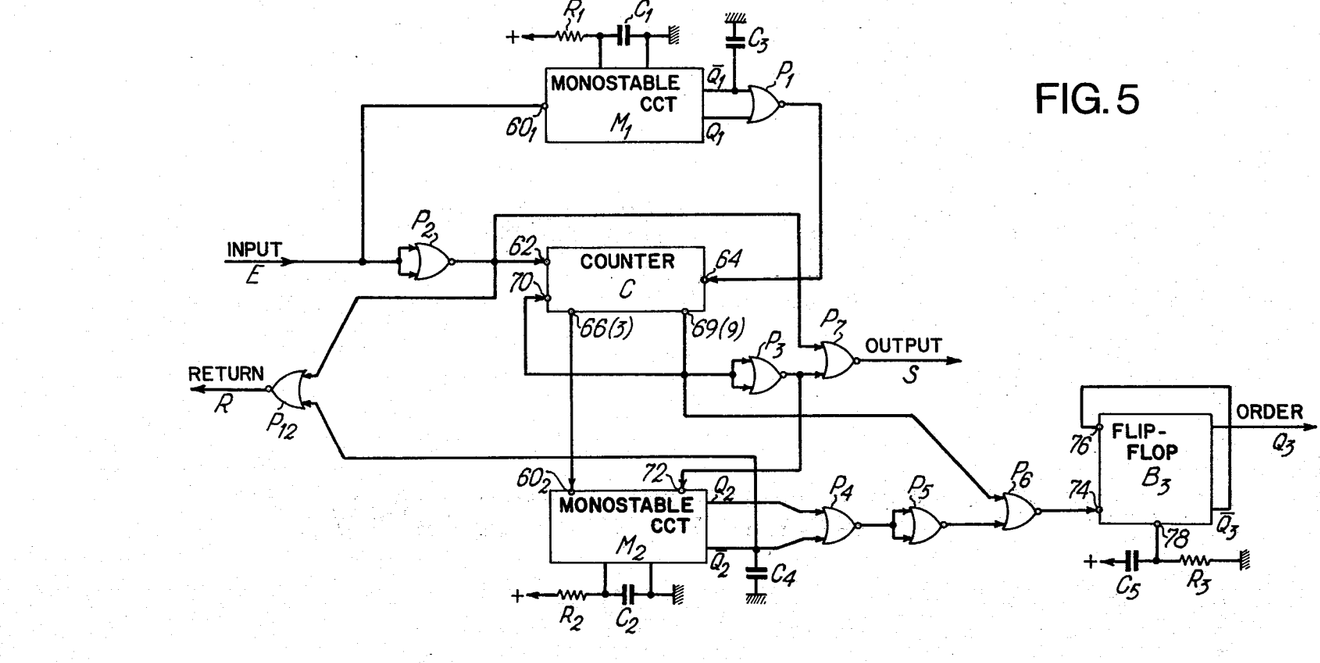
FIG. 5 illustrates a second embodiment of a circuit according to the invention.

The variant of FIG. 5 also corresponds to a case where a return channel R is present, but provides a simplification by suppressing gates $P_8$ to $P_{11}$, together with data $A_1$ and $A_2$. The other components are identical to those of FIG. 3 and carry the same references.

Figure 6:
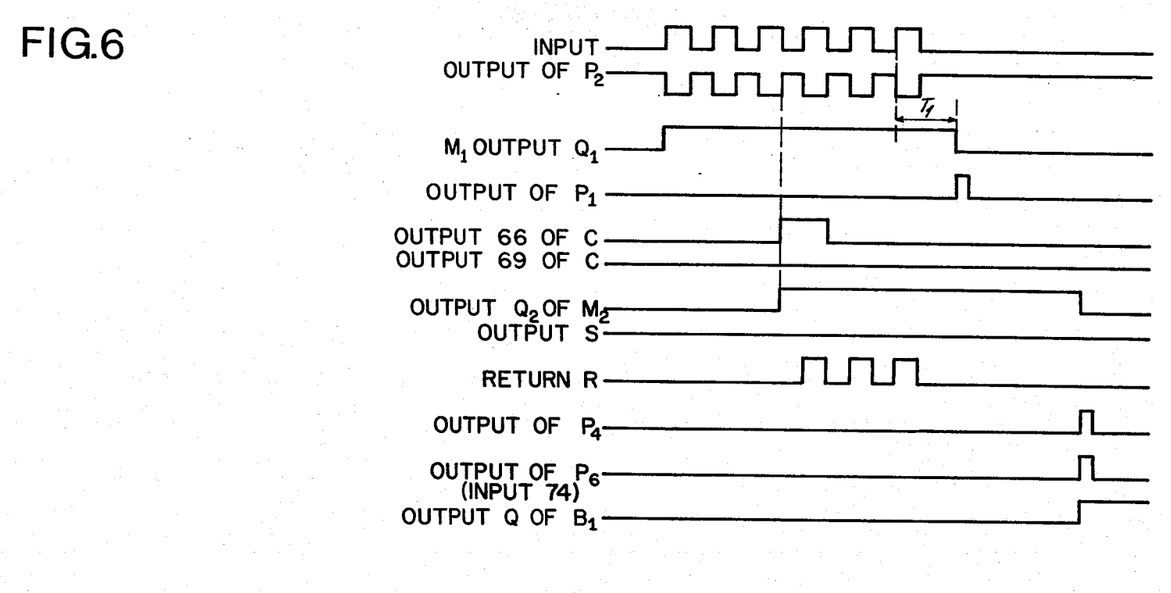
FIG. 6 is a chronogram illustrating the operation of the circuits of FIGS. 3 or 5 in the second case of $(n < n_1)$ operations.

The chronogram of FIG. 6 illustrates the operation of the circuit according to this second variant. It corresponds to the case where the number of pulses received by the regenerating repeater is between 3 and 9.

This variant makes it possible to control the satisfactory routing of the looping and unlooping order in the case of remote location and consequently, in the case of a stand-by supply, to locate a cable break. In the case of remote monitoring, the return channel is also used for transmitting quality data from the repeaters following interrogation by the monitoring station and without constituting a frame.

Figure 7:
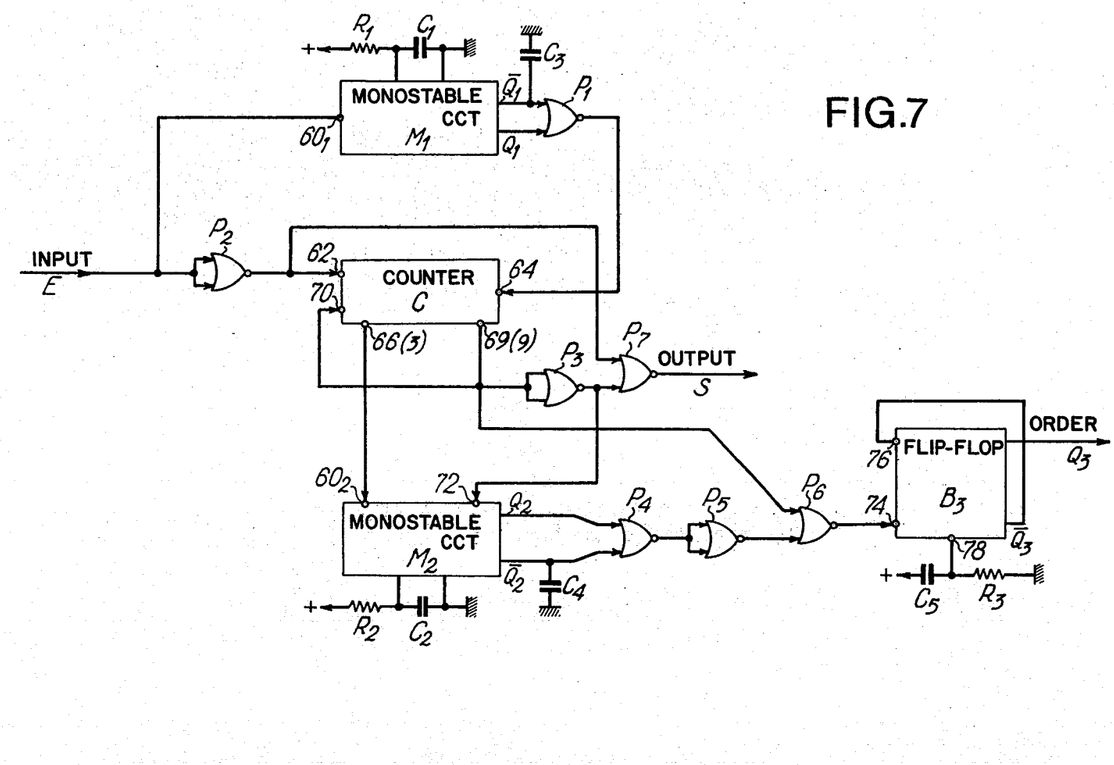
FIG. 7 illustrates a third embodiment of a circuit according to the invention in the case where the system has no return channel.

Finally, the circuit of FIG. 7 corresponds to a variant in which there is no return line. The means shown once again have the same references in FIGS. 3 and 5 and their operation is immediately apparent from what has been stated hereinbefore.

This variant makes it possible to transmit from the monitoring station to a random repeater along the link, the looping and unlooping orders necessary for remote location, in accordance with the principle described hereinbefore relative to the 140 Mbit/s system (i.e. with indirect control of the performance of the order by measuring the transmission time of the digital signal), but with the two following advantages:

The use of a single low frequency transmission channel instead of two such channels.

The possibility of direct looping at any random point on the link, which reduces the locating time for a given fault. In this case, the fastest procedure is to loop in the centre of the link in order to determine which half is involved and then gradually approach the fault by successively dividing the number of suspected repeaters by two. The number of loopings to be performed in all these cases is equal to the power of 2 immediately above the number of repeaters. For a 100 km link having 51 140 Mbit/s repeaters, 6 loopings are necessary. In the prior art sequential procedure, 25 loopings are necessary on average and can reach 51 in the worst case. Each looping lasts 2 seconds during which it is possible to reliably evaluate operation. The average time obtained is consequently 12 seconds as against 50 seconds on average and 100 seconds in the worst case with the prior art. The difference increases with the length of the link, because multiplying by two of the number of repeaters leads to a doubling of the time necessary in the case of sequential looping and only an increase of 2 seconds with the method of the invention. For example, in the case of a PARIS-LYON-type link equipped with two intermediate remote supply stations without line terminals and having about 200 repeaters the remote location time would become prohibitive with the prior art system (200 seconds on average and 400 seconds in the worst case), but will be acceptable in the case of the system of the invention (16 seconds in all cases). The flexibility of the procedure also makes it possible tin the case of intermittent faults which are too short to be located at one go to take account for each location of information obtained during previous operations.

The circuits which can be used according to the invention can be standard CMOS technology circuits which, as is known, lead to a low consumption level. These circuits and the circuits necessary for low frequency transmission can be supplied by a low capacity energy source (Cd-Ni accumulator) whose charge is maintained by the remote supply current in normal operation.

When a cable fault leads to an interruption in the remote supply, it renders inoperative the prior art remote location and monitoring system. It is then necessary to provide a dividing cable break locating device which involves complex apparatus and measurements. When using the system according to the invention, energised via an auxiliary energy source, able to ensure the operation of the system of a few minutes, it is possible to locate both the cable breaks and the defective repeaters.

Figure 8:
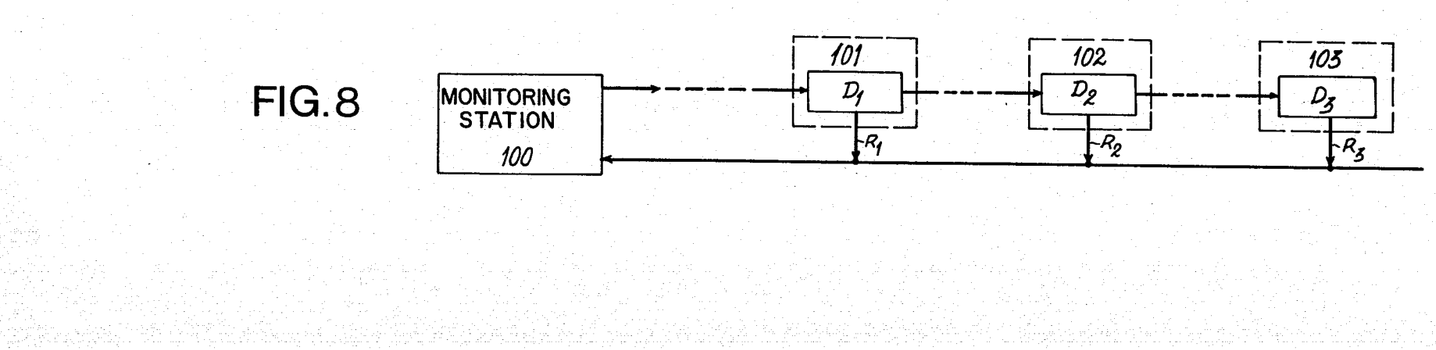
FIG. 8 is a simplified diagram of a link according to the invention with three pairs of repeaters.
Figure 9:
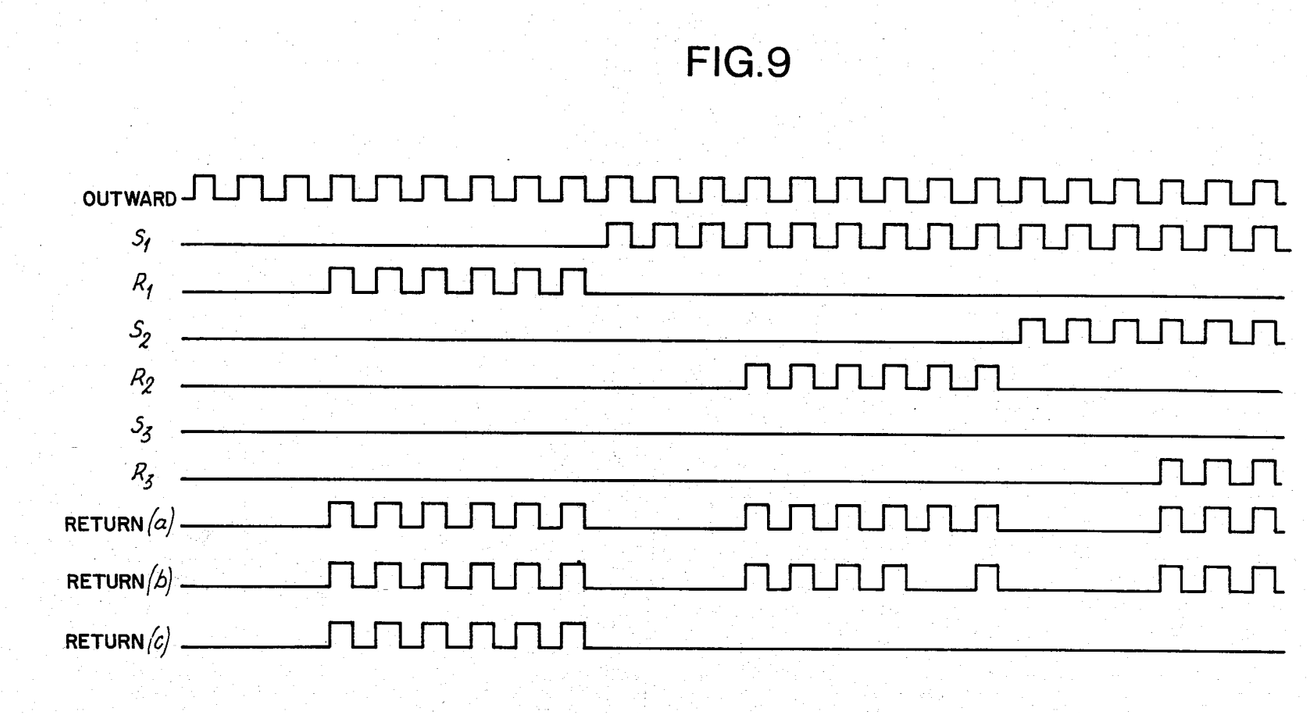
FIG. 9 is a chronogram illustrating the remote control principle for the link according to FIG. 8.

FIGS. 8 and 9 illustrate the principle of the invention in the case where a monitoring station 100 transmits to repeaters 101, 102, 103, etc. pulses which are able to transmit an order to the third repeater 103.

Each repeater 101, 102, 103 is equipped with a device of the type referred to hereinbefore ($D_1$, $D_2$, $D_3$) with an input respectively $E_1$, $E_2$, $E_3$, an output respectively $S_1$, $S_2$, $S_3$ and a return respectively $R_1$, $R_2$ and $R_3$. FIG. 9 shows the different signals transmitted and received by these circuits. The three latter lines indicate the signals of the return channel in the three following cases:

(a) operation is correct
(b) a fault is present in repeater 102
(c) a break is present between 101 and 102.

Figure 10:
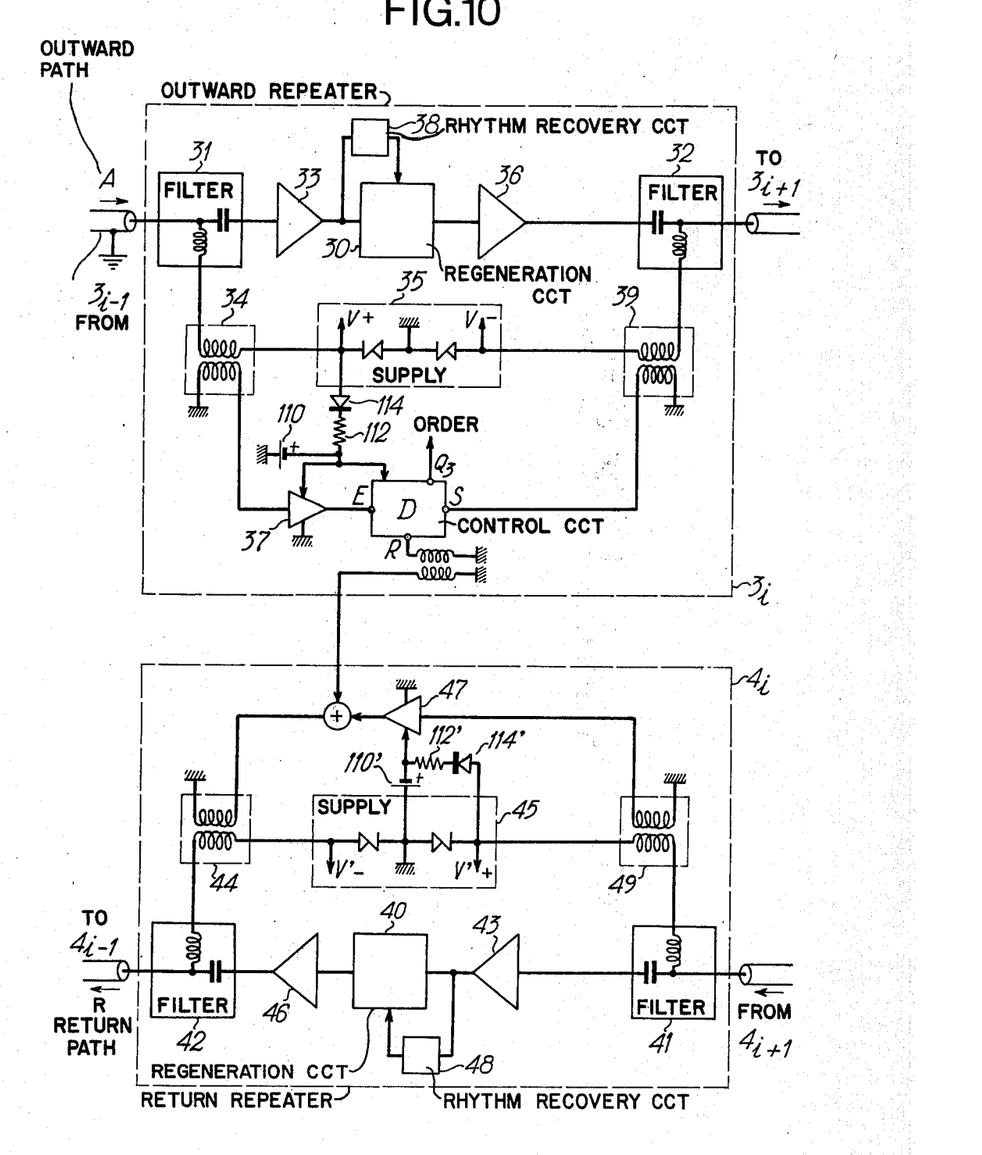
FIG. 10 is a diagram of a pair of repeaters equipped with a system according to the invention.

FIG. 10 illustrates an exemplified embodiment of a system according to the invention. The general construction of the two repeaters is the same as that of FIG. 2 and the elements forming the same carry the same references for simplification purposes. However, the looping control circuit is replaced by circuit D described hereinbefore in connection with FIGS. 3 or 5. The order transmitted by the line terminal can relate to a remote location or a remote monitoring and its processing is consequently not indicated in detail in FIG. 10.

Circuit D, as well as amplifier 37 necessary for the transmission of the low frequency carrier are not supplied directly by the Zener diodes for regulating the repeater, and instead are supplied via an accumulator 110. In normal operation, charging of the latter is ensured by the remote supply current, a resistor 112 preventing any overloading. A diode 114 prevents the accumulator from supplying the remainder of the repeater from stopping the remote supply current.

It is preferable to adopt an accumulator type which can remain discharged for the storage time of the repeaters (e.g. a cadmium-nickel accumulator). If not, it is necessary to have a supplementary device which disconnects the accumulator beyond a given discharge value.

An identical assembly formed by an accumulator 110', a resistor 112' and a diode 114' makes it possible to supply the amplifier 47 necessary for the transmission of the low frequency signal in the return direction. Naturally, this second assembly serves no useful purpose for systems, whose bidirectional repeaters have a common supply source.

The capacity of accumulators 110 and 110' thus makes it possible to supply the circuits in question for a short time which does not exceed a few minutes. Thus, their size remains compatible with the present equipment miniaturisation trend.

What is claimed is:

1. A remote control system for a telecommunications link between two stations, one being a monitoring station and the other a monitored station, interconnected by an outward channel and a return channel, said channels having a plurality of signal regenerating member pairs, in each pair an outward member being allocated to the outward channel and a return member being allocated to the return channel, said link incorporating a low frequency remote supply channel and each regenerating member incorporating a detection and amplification circuit for a low frequency signal transmitted by the monitoring station, said circuit being connected between the output and input of each member, each pair of regenerating members comprising means for permitting a remote control operation of said pair from the monitoring station, each pair also having a control circuit of said remote control means, the monitoring station comprising means for transmitting by the low frequency channel and in the outward direction a sequence of P pulses, the number P being regulatable; the control circuit placed in each pair of regenerating members having an input connected to the detection and amplification circuit of the low frequency signal, a first output connected to the output of the outward member and a second control output, and comprising means for detecting the pulses received on said input, for counting the number n of said pulses, for comparing said last number with two predetermined numbers $n_1$ and $n_3$, with $n_3 \neq 0$ and $n_3 < n_1$ and when $n \geq n_1$ transmitting to the first output $n - n_2$ the pulses received, $n_2$ being a given number $>1$ and when $n_3 < n < n_1$ transmitting to the second output the control order and transmitting no pulse to the first output, the number P of pulses transmitted by the monitoring station being selected equal to $Nn_2 + n_i$, in which $n_i$ is a number between $n_3$ and $n_1$ when a remote control order has to be transmitted to the member occupying rank N on the outward channel.

2. A system according to claim 1, wherein each control circuit also has means for supplying to a third output connected to the output of the associated return member a number $n_4$ of pulses when $n \geq n_1$ and $n_5$ of pulses when $n_3 < n < n_1$, the terminal of the monitoring station then being able to detect the pulses which it receives by the return channel.

3. A system according to claim 2, wherein each regional member has means for eliminating one or more of the $n_4$ pulses which it has to transmit, this suppression being significant of its operating state.

4. A system according to claim 1, wherein it also has at least one accumulator charged by the regenerating member supply means and which can supply the control circuit after interruption of the normal remote supply circuit.

5. A system according to claim 2, wherein the control circuit has an input E connected to a monostable circuit $M_1$, a counter C whose clock input is connected to the input and a resetting input connected to the output of $M_1$, said counter having a plurality of outputs corresponding to numbers which are a function of the values of $n_1$, $n_2$, $n_3$, $n_4$, a second monostable circuit $M_2$ connected to the counter, a flip-flop $B_3$ connected as a divider by two, a logic NOR gate $P_7$ with two inputs respectively connected to counter C and input E, and an output constituting the output S of the circuit.

6. A system according to claim 5, wherein it also comprises a logic NOR gate $P_{12}$, whose inputs are connected to E and to the counter and whose output constitutes the circuit return R.

7. A system according to claim 1, wherein said signal regenerating member pairs are amplifiers in the case of analog links between said stations and regenerative repeaters in the case of digital links between said stations.

8. A system according to claim 1, wherein said means permitting a remote control operation of said pair from the monitoring station is adapted to perform one of the following tasks: looping of the pair, unlooping of the pair, reading of an error counter and resetting thereof, and monitoring of the operation of the member pair.

* * * * *